US007958159B1

(12) United States Patent
Tran et al.

(10) Patent No.: US 7,958,159 B1
(45) Date of Patent: Jun. 7, 2011

(54) PERFORMING ACTIONS BASED ON MONITORING EXECUTION OF A QUERY

(75) Inventors: Hoa Thu Tran, Escondido, CA (US); Choung H. Kim, Torrance, CA (US)

(73) Assignee: Teradata US, Inc., Dayton, OH (US)

( * ) Notice: Subject to any disclaimer, the term of this patent is extended or adjusted under 35 U.S.C. 154(b) by 964 days.

(21) Appl. No.: 11/311,747

(22) Filed: Dec. 19, 2005

(51) Int. Cl.
*G06F 7/00* (2006.01)

(52) U.S. Cl. .......................................... 707/802; 707/634

(58) Field of Classification Search .................. None
See application file for complete search history.

(56) References Cited

U.S. PATENT DOCUMENTS

| 5,991,758 | A * | 11/1999 | Ellard ............................... 707/6 |
| 6,697,794 | B1 * | 2/2004 | Milby ............................... 707/2 |
| 6,801,903 | B2 * | 10/2004 | Brown et al. ...................... 707/2 |
| 6,938,044 | B1 | 8/2005 | Milby |
| 7,302,422 | B2 * | 11/2007 | Bossman et al. ................... 707/2 |
| 7,395,537 | B1 | 7/2008 | Brown |
| 7,409,676 | B2 * | 8/2008 | Agarwal et al. ............... 707/100 |
| 7,499,907 | B2 | 3/2009 | Brown |
| 2003/0065648 | A1 * | 4/2003 | Driesch et al. ..................... 707/2 |
| 2003/0088546 | A1 | 5/2003 | Brown |
| 2005/0192978 | A1 * | 9/2005 | Lightstone et al. ........... 707/100 |
| 2006/0026179 | A1 | 2/2006 | Brown |
| 2006/0036989 | A1 * | 2/2006 | Chaudhuri et al. ........... 717/101 |
| 2006/0149695 | A1 * | 7/2006 | Bossman et al. ................ 706/48 |
| 2007/0061289 | A1 | 3/2007 | Brown |
| 2007/0061290 | A1 | 3/2007 | Brown |
| 2007/0061375 | A1 | 3/2007 | Brown |
| 2007/0078843 | A1 | 4/2007 | Brown |
| 2007/0100793 | A1 * | 5/2007 | Brown et al. ..................... 707/2 |
| 2007/0130231 | A1 | 6/2007 | Brown |
| 2007/0162426 | A1 | 7/2007 | Brown |
| 2007/0174346 | A1 | 7/2007 | Brown |
| 2007/0271570 | A1 | 11/2007 | Brown |
| 2008/0092142 | A1 | 4/2008 | Tran |
| 2008/0133456 | A1 | 6/2008 | Richards |
| 2008/0133608 | A1 | 6/2008 | Brown |
| 2008/0162417 | A1 | 7/2008 | Morris |
| 2008/0162418 | A1 | 7/2008 | Morris |
| 2008/0162419 | A1 | 7/2008 | Brown |
| 2008/0162583 | A1 | 7/2008 | Brown |

OTHER PUBLICATIONS

D.P. Brown et al., U.S. Appl. No. 10/730,348, entitled "Administering the Workload of a Database System Using Feedback," dated Dec. 8, 2003, pp. 1-29, Figs. 1-9.

* cited by examiner

*Primary Examiner* — Tim T. Vo
*Assistant Examiner* — Jau-Shya Meng
(74) *Attorney, Agent, or Firm* — Trop, Pruner & Hu P.C.

(57) ABSTRACT

In a database system, a database request is received, and database software dispatches steps associated with the database request to plural access modules of a database system for execution. Statistics are collected regarding execution of each step by a respective access module in response to receiving an indication of completion by the respective access module. It is determined whether statistics relating to execution of the database request violate one or more predefined rules, and in response to determining that the statistics relating to execution of the database request violate one or more predefined thresholds, one or more actions are performed by the database software.

19 Claims, 3 Drawing Sheets

US 7,958,159 B1

PERFORMING ACTIONS BASED ON MONITORING EXECUTION OF A QUERY

BACKGROUND

A relational database management system stores relational tables, which are accessed by queries according to a standard database query language (such as the Structured Query Language or SQL). Examples of SQL statements include INSERT, SELECT, UPDATE, and DELETE. The SELECT statement is used to retrieve information from the database and to organize information for presentation to a user or an application program. The INSERT statement is used to insert a row (or multiple rows) into a table. The DELETE statement is used to delete a row (or multiple rows) from a table. The UPDATE statement is used to modify or change the content of the table. When a SQL query is received by a database system, a parser interprets the query statement, checks the statement for proper SQL syntax, and evaluates it semantically.

Some database systems are implemented as parallel database systems having a plurality of processor modules. Properly controlling execution of a database query in a parallel database system, particularly when anomalies are occurring, is typically very challenging. Usually, when anomalies occur, manual intervention by database administrators is often required to take appropriate actions in response to the anomalies. In a complex database system such as a parallel database system, manual intervention usually requires that a database administrator have extensive knowledge regarding the internal workings of the database system to properly identify anomalies and effect appropriate actions.

SUMMARY

In general, a rule-based mechanism is provided to allow a database system to monitor execution of a database request based on one or more predefined rules, and to automatically take one or more predefined actions in response to detection of a violation of the one or more predefined rules.

Other or alternative features will become more apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
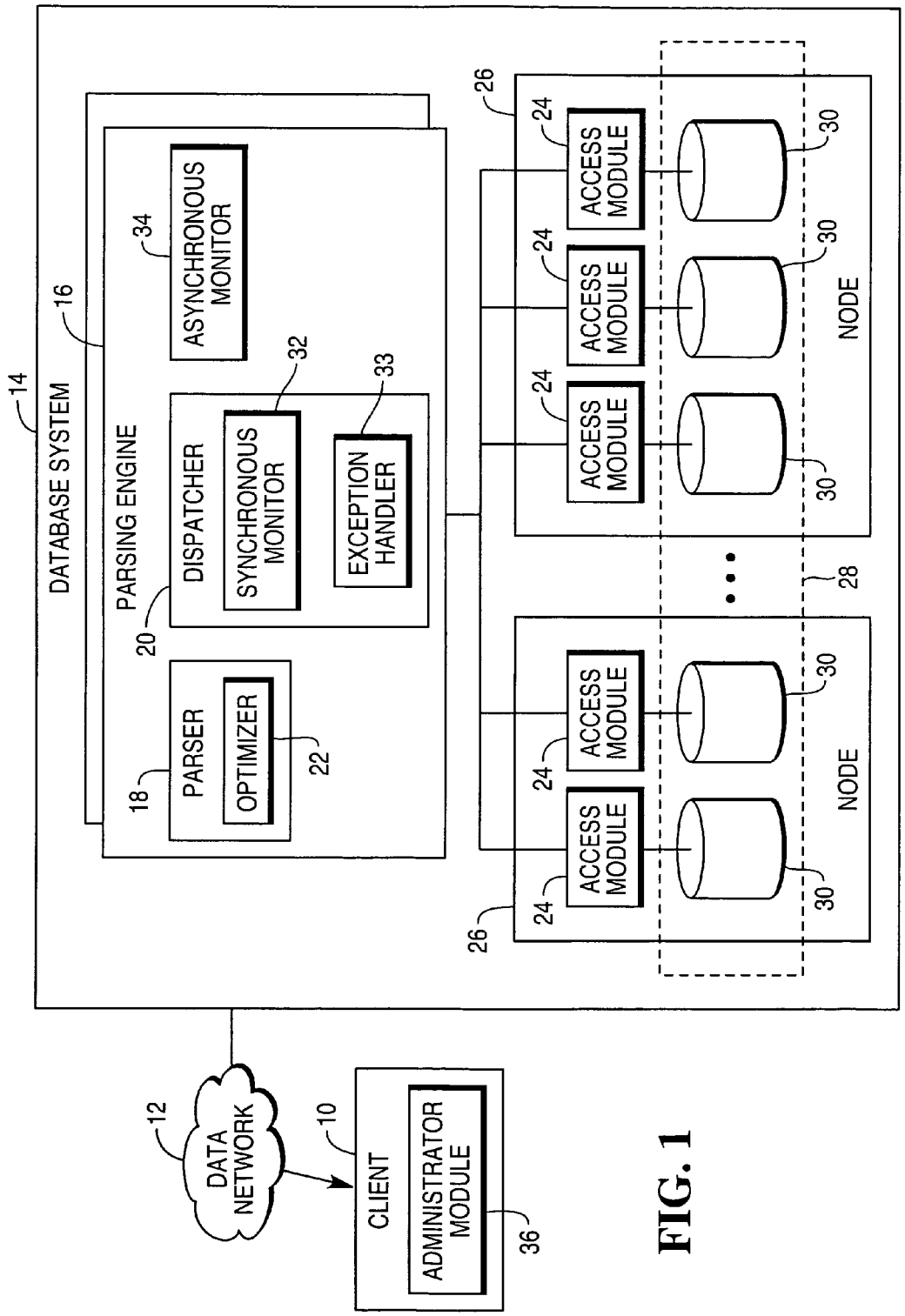
FIG. 1 is a block diagram of an example arrangement that includes an example database system.

FIG. 1 illustrates an example arrangement in which a client system 10 is coupled to a database system 14 over a data network 12. Examples of the data network 12 include a local area network (LAN), a wide area network (WAN), the Internet, and so forth. The client system 10 is capable of issuing queries according to a standard database query language to the database system 14 to access or update data or to create or alter data structures (e.g., tables, rows, and so forth). One example of a standard database query language is the Structured Query Language (SQL), as promulgated by the American National Standards Institute (ANSI). Alternatively, the client system 10 is also able to submit other types of database requests (which can be in the form of utilities, stored procedures, and so forth) to the database system 14.

The term "database request" refers to any one or more of a database query (e.g., an SQL query), a utility (e.g., a load utility for loading data into the database system, an export utility for exporting data from the database system, an so forth), a stored procedure (which contains instructions to perform tasks), and other types of requests.

Instead of or in addition to receiving database requests from the client system 10, the database system 14 can receive requests from a user interface associated with the database system 14, or from a software application running in the database system 14.

The database system 14 includes a storage 28 that stores various data, including relational tables. Each relational table contains rows and columns. The storage 28 includes plural storage modules 30 for storing respective portions (groups of rows) of relational tables. In the parallel environment depicted in FIG. 1, the rows of each relational table are distributed across plural storage modules 30. Data in the storage modules 30 can be accessed concurrently by respective access modules 24. As depicted in FIG. 1, the database system 14 also includes nodes 26 (e.g., a computer node) on which the access modules 24 and storage modules 30 are deployed. In the example arrangement of FIG. 1, one node 26 includes two access modules 24 and two respective storage modules 30, while another node 26 includes three access modules 24 and three respective storage modules 30.

In some embodiments, the access modules 24 are software modules that run on one or plural central processing units (CPUs) of each respective node. Each access module 24 performs the following tasks: inserts, deletes, or modifies contents of tables; creates, modifies, or deletes definitions of tables; retrieves information from definitions and tables; and locks databases and tables. In one example, each access module 24 is based on an access module processor (AMP) used in some TERADATA® database systems from NCR Corporation. The presence of multiple access modules 24 and corresponding storage modules 30 define a parallel database system. In alternative embodiments, instead of database systems having multiple nodes, a database system with only one access module can be employed. In yet another arrangement, instead of plural nodes 26, a single-node system can be used, with the single node containing one or plural access modules 24.

As further shown in FIG. 1, the database system 14 includes a parsing engine 16 (or plural parsing engines), with each parsing engine having a parser 18 and a dispatcher 20. The parser 18 receives database queries (such as those submitted by the client system 10 or from another source) and parses the received query. The parser 18 is also able to parse other types of database requests.

The parser 18 includes an optimizer 22 that generates query plans, selecting the most efficient from among the plural query plans. The parser 18 also generates executable steps based on the parsed query and passes the steps to the dispatcher 20. The dispatcher 20 then sends the executable steps generated by the parser 18 to multiple access modules 24 in the database system. A "step" that is generated by the parsing engine 16 for execution by one or more access modules 24 includes a command (or commands) indicating a data processing task (e.g., data retrieval, data sort, join, etc.) to be performed on the content of one or more relational tables. The access modules 24 and parsing engine 16 are part of the database software executable in the database system 14.

In accordance with some embodiments, the parsing engine 16 includes two types of monitors: a synchronous monitor 32 and an asynchronous monitor 34. Note that an asynchronous monitor is associated with each parsing engine 16 and a synchronous monitor is associated with each dispatcher 20, according to an embodiment. In some arrangements, a parsing engine may include more than one dispatcher. The synchronous monitor 32 and asynchronous monitor 34 are collectively referred to as a monitoring mechanism. The monitoring mechanism is able to perform real-time monitoring of execution of a database request against predefined one or more rules (also referred to as "monitoring rules"), which in some embodiments are expressed as one or more thresholds. "Real-time monitoring" refers to monitoring as a database request is being executed in the database system 14.

Examples of thresholds include a response time limit (a limit on the time between the start of execution of a database request and the present time), consumed CPU time limit (a limit on the amount of time the CPU spends executing the database request), threshold number of input/output (I/O) cycles (the limit on the number of I/O cycles that can be incurred during execution of the database request), CPU skew limit (the limit on a difference between the highest usage of the CPU by one access module and the lowest usage of the CPU by another access module when executing a database request), I/O skew limit (the limit on a difference between the highest I/O count by one access module and the lowest I/O count by another access module when executing a database request), maximum row count limit (a limit on the maximum number of rows that can be generated during execution of a database request), blocked time limit (a limit on the amount of time that one database request can be blocked by another database request), disk-to-CPU ratio (or CPU-to-disk ratio) threshold (a limit on the ratio between the total I/O count for a given access module and the CPU time consumed by the given access module when executing a database request), spool space limit (the limit on the total amount of spool space that can be used during execution of a database request), threshold number of access modules (a limit on the number of access modules that can be involved in execution of a database request), and other thresholds (or any combination of the above thresholds).

If the monitoring mechanism detects that execution of the database request has caused violation of any of the predefined thresholds, then the monitoring mechanism issues an indication of an exception. An "exception" refers to occurrence of an anomaly. Violation of a predefined threshold means that a statistic regarding resource usage in the database system during execution of the database request either exceeds or is below the predefined threshold. More generally, violation of a predefined rule means that the collected statistic is not in an expected range or at an expected value.

In response to an exception condition, an exception handler 33 in the dispatcher 20 (or some other module in the database system 14) can take one or more predefined actions, such as logging the exception and continuing with execution of the query; changing a priority of the query; stopping or aborting the query; executing a preselected software program to perform a desired task; or sending an alert such as an electronic mail, page, phone call, and so forth.

The monitoring mechanism is a rule-based monitoring mechanism that can automatically detect anomalies during execution of a database request. In response to detection of anomalies, the exception handler 33 can automatically take appropriate action to ensure that the database request executes properly. In this way, manual intervention by a user is either eliminated or reduced for enhanced efficiency in the control of execution of a database request by the database system 14.

As further depicted in FIG. 1, an administrator module 36 that is capable of interacting with the monitoring mechanism and the exception handler 33 is executable in the client system 10. In an alternative arrangement, the administrator module 36 can be executed in the database system 14 or at another node. The administrator module 36 provides a user interface, such as a graphical user interface (GUI), to allow an administrator or other user to access and update various predefined rules relating to the monitoring mechanism. For example, using the administrator module 36, the user can change the various predefined thresholds (or other monitoring rules) discussed above. In addition, using the administrator module 36, the user is able to also define or change exception processing rules regarding actions to take by the database software in response to an exception.

The administrator module 36 can also be used to also specify "workload definitions," which define workloads. A "workload" is a set of database requests (which may include queries, utilities, and others) that have some common characteristics, such as application, source of request, type of query, priority, response time goals, and so forth. The workload definitions can define various different classes of workloads. For example, certain types of queries are intended to execute quickly in a relatively short amount of time. These types of queries can be grouped into one workload, as defined by a first workload definition. Other types of queries, such as queries involving joins of large tables, may take much longer to execute. These types of queries can be grouped into another workload, as defined by another workload definition.

Using the administrator module 36, a user can load workload definitions from the client system 10 to the database system 14. Each workload definition is associated with its corresponding set of predefined monitoring rules (used by the monitoring mechanism) and set of exception processing rules (used by the exception handler 33). Different types of queries that are classified in different workloads are associated with different sets of monitoring rules and exception handling rules.

As noted above, the monitoring mechanism includes a synchronous monitor 32 and an asynchronous monitor 34. The synchronous monitor 32 performs synchronous monitoring, in which the synchronous monitor 32 gathers statistics regarding execution of a database request at the end of each step (as executed by a corresponding access module 24). The end of a step is indicated by an indication of completion of the step issued by the corresponding access module 24. Thus, if the synchronous monitor 32 is used to collect statistics, then the statistics are collected at the end of each step. Synchronous collection of statistics refers to collection of statistics synchronously with the completion of each step by an access module. The synchronous monitoring technique is usually effective for database requests that are expected to execute in a relatively short period of time.

However, for database requests that are expected to take a long time to execute (such as sorts of large tables, joins of large tables, and so forth), the asynchronous monitor 34, instead of the synchronous monitor 32, is used to collect statistics regarding execution of a database request. The asynchronous monitor 34 is able to collect statistics before a step has completed execution by an access module 24. In this way, the asynchronous monitor 34 will be able to determine if some anomaly has occurred without having to wait for completion of a long step (which can take hours or days to complete). Asynchronous collection of statistics refers to collection of statistics during execution of a step, without waiting for completion of the step by an access module. Asynchronous collection occurs periodically at fixed time intervals and the interval between collections is configurable using the administrator module 36.

In some embodiments, the dispatcher 20 invokes both the synchronous monitor 32 and asynchronous monitor 34 in response to a received database request. Either monitor 32 or 34 can detect execution anomalies for both short and long database requests. In practice, the synchronous monitor 32 is more likely to detect anomalies for short database requests, while the asynchronous monitor 34 is more likely to detect anomalies for long database requests. In other embodiments, a selected one of the synchronous monitor 32 and asynchronous monitor 34 is invoked in response to a received request (such as depending on the type of the request).

Generally, the synchronous monitor 32 employs a statistics collection mechanism already enabled by database software in the ordinary course of execution of a database request, such that collection of the statistics for exception monitoring does not impose too much additional burden on the processing capacity of the database system. The asynchronous monitor 34 is a timer-based monitor that consumes extra resources whenever it is invoked. Therefore, it is desirable that the synchronous monitor 32 be used whenever possible; however, the enhanced efficiency of the synchronous monitor 32 is counter-balanced by the desire to collect statistics, using the asynchronous monitor 34, more frequently than at the end of completions of steps to avoid long runs without being able to monitor for exceptions.

Figure 2:
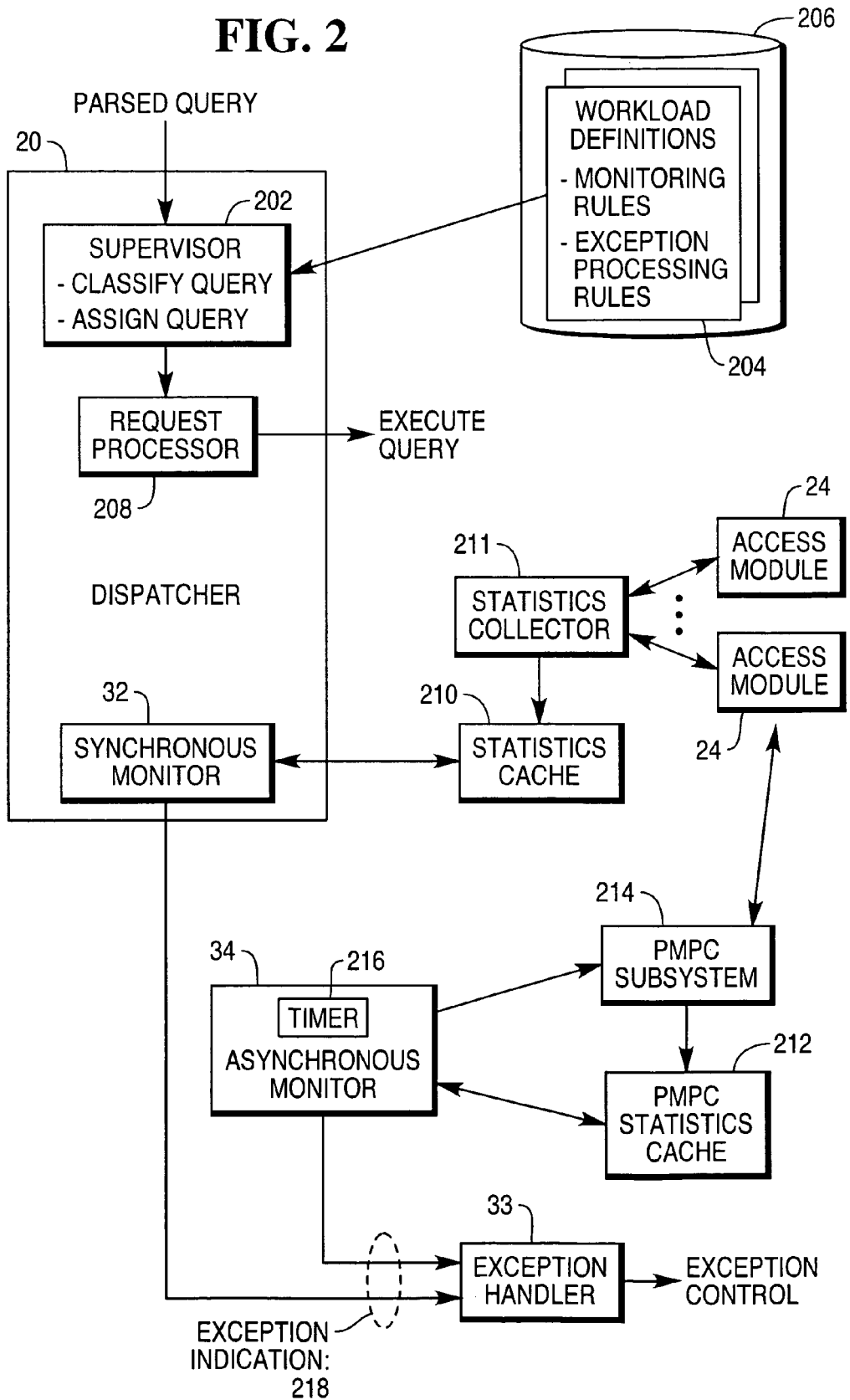
FIG. 2 is a block diagram illustrating components involved in monitoring execution of a database query and taking actions based on the monitoring, in accordance with an embodiment.

FIG. 2 shows an example exception monitoring and handling procedure, in accordance with an embodiment. A parsed query (from the parser 18 of FIG. 1) is received by a supervisor module 202 (which is part of the dispatcher 20). The supervisor module 202 classifies and assigns the query to a selected one of plural workload definitions 204. Classifying a received query refers to analyzing the attributes (e.g., user identifier, application identifier, estimated response time, estimated answer set size, type of query, date and time of the query, etc.) of the query and comparing the attributes to the content of the workload definitions 204. Assigning the received query refers to indicating that the received query belongs to a particular workload definition 204 based on the classifying.

In some cases, a received query may not match any workload definition 204, in which case the received query can be assigned to a default workload definition. The workload definitions 204 can be stored in the storage 206 (which can be storage 28 in FIG. 1 or memory in any of the nodes 26 of FIG. 1). Once the supervisor module 202 has classified and assigned the received query to a selected workload definition 204, the query can be executed (by issuing steps from a request processor 208 in the dispatcher 20 to one or plural access modules 24).

Note that the supervisor module 202 can similarly perform classifying and assignment tasks with respect to other types of database requests (such as utilities, stored procedures, and so forth).

Each workload definition 204 includes a set of monitoring rules (used by the monitoring mechanism to identify exception conditions) and a set of exception processing rules (used by the exception handler 33 of FIG. 1 to perform predefined actions in response to an exception indicated by the monitoring mechanism).

In some embodiments, as the received query is executed, both the synchronous monitor 32 and asynchronous monitor 34 is invoked to collect statistics regarding resource usage associated with execution of steps by the access modules 24 corresponding to the executed query. Note that multiple instances of the synchronous monitor 32 or asynchronous monitor 34 can be running concurrently for collecting statistics for executions of respective database requests. In other embodiments, just one of the synchronous monitor 32 and asynchronous monitor 34 is invoked to collect statistics, depending on which workload definition 204 the received query is assigned.

The synchronous monitor 32 uses statistics (regarding resource usage) stored in a statistics cache 210. The statistics cache 210 refers to any storage region (provided by any type of storage) for storing statistics relating to execution of a database request. The statistics stored in the statistics cache 210 are collected by a statistics collector module 211, which collects the statistics at the end of execution of each step by an access module 24. The collected statistics include one or more of the following: total response time of a step (as executed by an access module 24); CPU time consumed by one or more access modules in performing the step; a count of I/O cycles involved in the step performed by one or more access modules; number of rows generated in execution of a step; usage of spool, in terms of size, in a step; number of access modules involved in processing a particular database request; skew of CPU usage by different access modules in execution of a database request; skew in I/O counts of different access modules in execution of a database request; an amount of time that a database request has been delayed due to execution of another database request; and other statistics. CPU usage by the parsing engine 16 can also be maintained in the statistics cache 210.

Note that the statistics collector 211 (or alternatively, the synchronous monitor 32) is able to aggregate certain types of statistics prior to comparison with a corresponding threshold. For example, if a threshold is a CPU usage limit, then the synchronous monitor 32 can sum the total usage of a CPU by one or plural access modules and by the parsing engine 16. As another example, the I/O count statistics are summed for the multiple access modules. The collected (including aggregated) statistics are compared by the synchronous monitor 32 against the monitoring rules specified by the selected workload definition 204.

The asynchronous monitor 34 includes a timer 216 that periodically causes the asynchronous monitor 34 to issue an indication to a performance management and production control (PMPC) subsystem 214 to cause the PMPC subsystem 214 to collect statistics from the access modules 24 during execution of a database request. The PMPC subsystem 214 notifies the requesting asynchronous monitor 34 (or all instances of the asynchronous monitor 34) that statistics collection has completed. The statistics collected by the PMPC subsystem 214 is stored in a PMPC statistics cache 212, which can be retrieved by the asynchronous monitor 34. Again, the statistics from the access modules 24 can be aggregated (either by the PMPC subsystem 214 or the asynchronous monitor 34) for the purpose of comparing against the monitoring rules.

In a different embodiment, instead of using two separate components (statistics collector module 211 and PMPC subsystem 214) to collect statistics for the synchronous monitor 32 and asynchronous monitor 34, a single statistics collection module can be used instead.

The asynchronous monitor 34 compares the collected statistics (and in some cases aggregated values of the statistics) against the monitoring rules of the corresponding workload definition 204, to determine whether an exception has occurred.

When either the synchronous monitor 32 or asynchronous monitor 34 detects an exception, the synchronous monitor 32 or asynchronous monitor 34 issues an indication 218 of the exception. In response to the indication 218 of the exception, the exception handler 33 can perform any one or more of the following actions (based on the exception processing rules contained in the corresponding workload definition 204): abort or reject execution of a database request; continue execution of the database request; continue execution of the database request under a new workload definition (which can change the priority of the request or some other aspect of the request); continue execution of the database request but also execute another software program to perform a task; continue with execution of the database request but issue an alert (e.g., e-mail, page, phone call, etc.); perform another action; or take no action.

In some embodiments, the synchronous monitor 32 and asynchronous monitor 34 do not monitor for exactly the same exceptions. The following table lists exception conditions that are monitored by just the synchronous monitor 32, by just the asynchronous monitor 34, or by both:

| EXCEPTION TYPE | DETECTION |
| --- | --- |
| Response Time | Synchronous & Asynchronous |
| CPU Time | Synchronous & Asynchronous |
| I/O Count | Synchronous & Asynchronous |
| CPU Skew | Synchronous & Asynchronous |
| I/O Skew | Synchronous & Asynchronous |
| Maximum Row Count | Synchronous |
| Blocked Time | Asynchronous |
| I/O to CPU Ratio Or CPU to I/O Ratio | Synchronous & Asynchronous |
| Spool Space | Synchronous & Asynchronous |
| Number of Access Modules | Synchronous |

In other words, the synchronous monitor checks for a first group of exception conditions, whereas the asynchronous monitor checks for a second, different group of exception conditions. However, in other embodiments, the synchronous and asynchronous monitors check for the same exception conditions.

Also, generally, after an exception is indicated, the processing performed by the synchronous and asynchronous monitors are generally the same. However, both or either of the synchronous monitor 32 and asynchronous monitor 34 can be configured to ignore certain exception conditions (e.g., CPU skew, I/O skew, or I/O to CPU ratio) during an exception qualification time (which may be some initial time after start of execution of a database request). Also, both or either of the monitors 32 and 34 can be configured to ignore an exception condition if the exception condition has previously occurred during execution of the database request.

Figure 3:
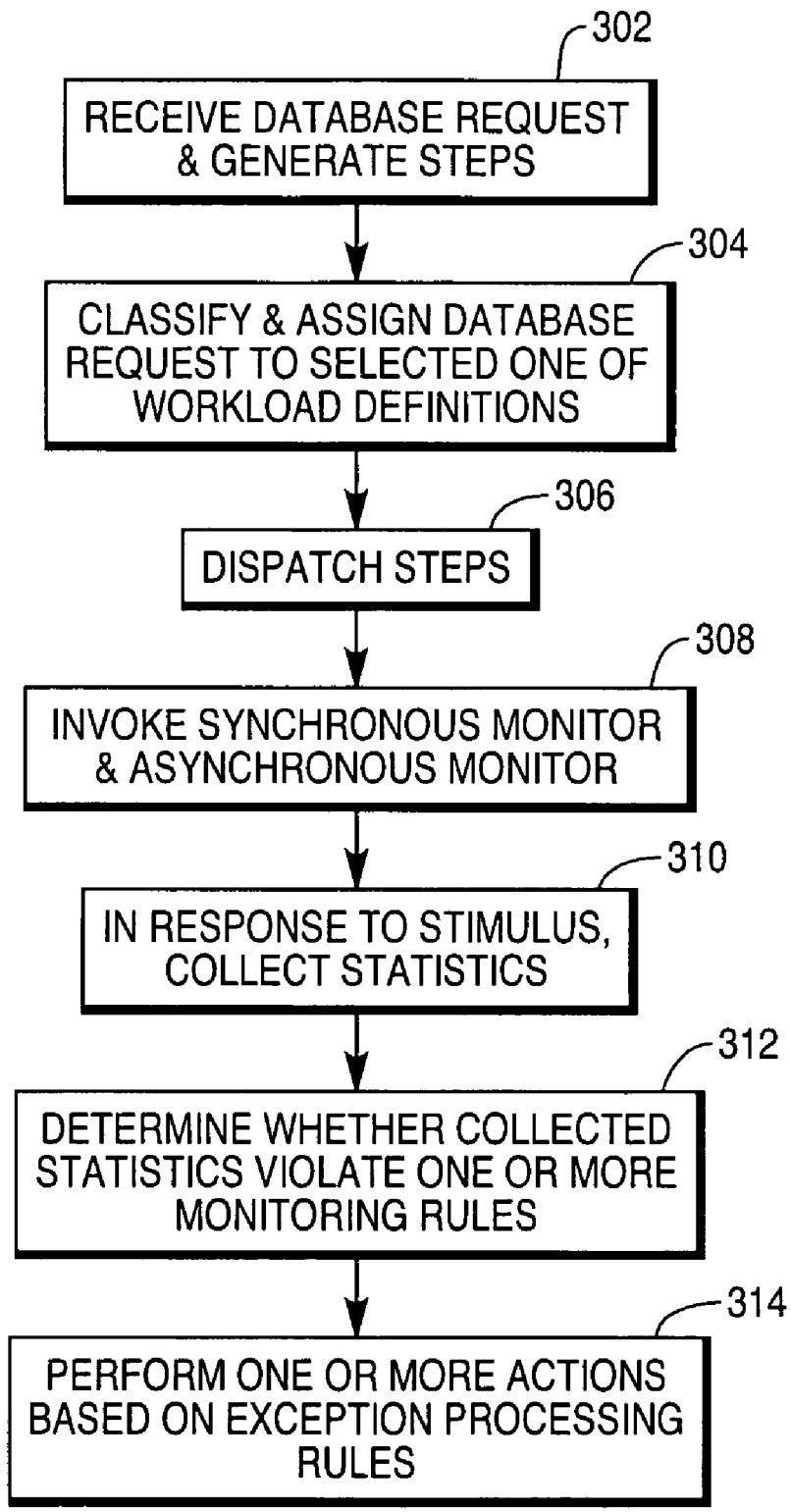
FIG. 3 is a flow diagram of an exception monitoring and handling procedure, in accordance with an embodiment.

FIG. 3 generally shows the monitoring and handling procedure performed by database software according to some embodiments. The parser 18 in the database software receives (at 302) a database request (e.g., query, utility, stored procedure, etc.) and generate the steps associated with the database request. In response to the received database request and steps, the supervisor module 202 in the database software classifies (at 304) the received database request and assigns the database request to a selected one of the workload definitions 204.

The dispatcher 20 dispatches (at 306) the steps to one or plural access modules 24. Also, the dispatcher 20 invokes (at 308) the synchronous monitor 32 and asynchronous monitor 34 for collecting statistics associated with execution of the steps.

In response to a predefined stimulus (such as an indication of a completion of a step for the synchronous monitor 32 or the expiration of the timer 216 for the asynchronous monitor 34), the synchronous monitor 32 or asynchronous monitor 34 collects (at 310) statistics of resource usage by the one or plural access modules 24.

The synchronous monitor 32 or asynchronous monitor 34 then determines (at 312) whether the collected statistics violate any of one or more predefined monitoring rules associated with the selected workload definition. If the collected statistics violate the one or more predefined rules, then the dispatcher 20, or other module of the database software, performs (at 314) one or more actions specified by the exception processing rules of the selected workload definition.

Instructions of the various software routines or modules discussed herein (such as the dispatcher 20, access module 24, synchronous monitor 32, asynchronous monitor 34, and administrator module 36 of FIG. 1) are loaded for execution on corresponding processors. The processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software modules and layers) are stored in one or more storage devices, which can be implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a database system having plural access modules, comprising:
    receiving a database request;
    dispatching, by database software executed on one or more processors, steps associated with the database request to one or plural access modules of the database system for execution;
    collecting statistics, by a synchronous monitor executed on the one or more processors, regarding execution of each step by a respective access module, wherein the synchronous monitor is triggered to collect the statistics in response to receiving an indication of completion of each step by the respective access module, wherein the synchronous monitor does not collect the statistics regarding execution of each step until the synchronous monitor is triggered in response to receiving the indication of completion of each corresponding step, wherein the statistics collected by the synchronous monitor include plural statistics selected from among CPU time consumed to perform each corresponding step, a count of input/output cycles involved in each corresponding step, and a number of rows of a table generated in execution of each corresponding step;

collecting statistics, by an asynchronous monitor executed on the one or more processors, regarding execution of the steps by the one or plural access modules prior to completion of the execution of the steps by the one or plural access modules;

determining whether statistics collected by the synchronous monitor or asynchronous monitor relating to execution of the database request violate one or more predefined rules; and in response to determining that the statistics relating to execution of the database request violate one or more predefined thresholds, performing one or more actions by the database software.

2. The method of claim 1, wherein collecting the statistics collected by the asynchronous monitor comprises collecting at least some of: CPU time consumed by the access modules; a count of I/O cycles; number of rows accessed; spool usage; number of access modules used; CPU usage skew between the access modules; I/O count skew between the access modules; and an amount of time that a database request has been blocked by another database request.

3. The method of claim 1, wherein violation of the one or more predefined rules indicates an exception condition in the database system, and wherein performing the one or more actions comprises performing at least one of logging the exception condition and continuing with execution of the database request; changing a priority of the database request; stopping or aborting the database request; executing a preselected software program to perform a task; and sending an alert.

4. A method for use in a database system having plural access modules, comprising:

receiving a database request;

dispatching, by database software executed on one or more processors, steps associated with the database request to one or plural access modules of the database system for execution;

collecting statistics, by a synchronous monitor executed on the one or more processors, regarding execution of each step by a respective access module, wherein the synchronous monitor is triggered to collect the statistics in response to receiving an indication of completion of each step by the respective access module;

collecting statistics, by an asynchronous monitor executed on the one or more processors, regarding execution of the steps by the one or plural access modules prior to completion of the execution of the steps by the one or plural access modules;

determining whether statistics collected by the synchronous monitor or asynchronous monitor relating to execution of the database request violate one or more predefined rules;

in response to determining that the statistics relating to execution of the database request violate one or more predefined thresholds, performing one or more actions by the database software;

storing workload definitions, each workload definition associated with a corresponding set of the one or more predefined rules; and classifying the received database request to assign the received database request to a selected one of the workload definitions, wherein determining whether statistics collected by the synchronous monitor or asynchronous monitor relating to execution of the database request violate the one or more predefined rules comprises determining whether statistics collected by the synchronous monitor or asynchronous monitor relating to execution of the database request violate the one or more predefined rules of the selected workload definition.

5. The method of claim 4, wherein classifying the received database request comprises comparing attributes of the database request with content of the workload definitions.

6. The method of claim 5, wherein comparing the attributes of the database request with content of the workload definitions comprises comparing the attributes including some of a user identifier, an application identifier, an estimated response time, an estimated answer set size, a type of query, and a date and time of the query.

7. The method of claim 4, wherein each workload definition is associated with a corresponding set of exception processing rules, and wherein performing the one or more actions by the database software is based on the exception processing rules of the selected workload definition.

8. An article comprising at least one computer-readable storage medium containing instructions that when executed cause a database system to:

receive a database request;

execute steps associated with the database request;

invoke a first monitor and a second monitor to collect statistics associated with execution of the database request, wherein the first monitor collects statistics in response to an indication of completion of each step;

wherein the second monitor collects statistics during execution of a step without having to wait for the indication of completion;

store plural workload definitions each associated with a corresponding set of the one or more predefined rules;

classify the received database request to a selected one of the workload definitions; and determine whether the collected statistics violate the one or more predefined rules of the selected workload definition.

9. The article of claim 8, wherein the instructions when executed cause the database system to further perform one or more actions in response to determining that the collected statistics violate the one or more predefined rules.

10. The article of claim 8, wherein the database system comprises a parallel database system having a plurality of access modules, and wherein invoking the first monitor and second monitor causes collection of statistics associated with execution of database request by the plurality of access modules.

11. The article of claim 8, wherein the first monitor does not collect statistics regarding execution of each step of the database request until the first monitor is triggered in response to the indication of completion of each corresponding step of the database request, wherein the statistics collected by the first monitor include plural statistics selected from among CPU time consumed to perform each corresponding step, a count of input/output cycles involved in each corresponding step, and a number of rows of a table generated in execution of each corresponding step.

12. A database system comprising:
one or more processors;
a parser executable on the one or more processors to receive a database request;
a dispatcher executable on the one or more processors to dispatch steps of the database request for execution;
a first monitor executable on the one or more processors to synchronously collect statistics associated with execution of the steps in response to indications of completion of corresponding steps, wherein the first monitor does not collect statistics regarding execution of each step of the database request until the first monitor is triggered in response to the indication of completion of each corresponding step of the database request, wherein the statistics collected by the first monitor include plural statistics selected from among CPU time consumed to perform each corresponding step, a count of input/output cycles involved in each corresponding step, and a number of rows of a table generated in execution of each corresponding step;
a second monitor executable on the one or more processors to asynchronously collect statistics associated with execution of the steps during execution of the steps without waiting for indications of completion of corresponding steps; and
a handler executable on the one or more processors to perform one or more actions in response to an exception indication from the first monitor or second monitor indicating that one or more predefined rules have been violated.

13. The database system of claim 12, wherein the first monitor is part of the dispatcher, the first monitor to receive an indication of completion of each step and to collect statistics associated with execution of the step in response to the indication of completion of the step.

14. The database system of claim 12, wherein the second monitor includes a timer to cause the second monitor to periodically collect statistics associated with execution of each step.

15. The database system of claim 12, wherein the first monitor is configured to check for a first group of exception conditions based on collected statistics by the first monitor, and wherein the second monitor is configured to check for a second, different group of exception conditions based on collected statistics by the second monitor.

16. The database system of claim 12, further comprising plural access modules and plural storage modules to store data distributed across the storage modules, the first monitor and second monitor to collect statistics associated with execution of the steps by the plural access modules.

17. The database system of claim 12, further comprising:
a first statistics collector invoked by the first monitor to collect statistics; and
a second statistics collector invoked by the second monitor to collect statistics.

18. A database system comprising:
one or more processors;
a parser executable on the one or more processors to receive a database request;
a dispatcher executable on the one or more processors to dispatch steps of the database request for execution;
a first monitor executable on the one or more processors to synchronously collect statistics associated with execution of the steps in response to indications of completion of corresponding steps;
a second monitor executable on the one or more processors to asynchronously collect statistics associated with execution of the steps during execution of the steps without waiting for indications of completion of corresponding steps;
a handler executable on the one or more processors to perform one or more actions in response to an exception indication from the first monitor or second monitor indicating that one or more predefined rules have been violated;
a storage to store workload definitions, each workload definition associated with a respective set of the one or more predefined rules; and
a module to classify the received database request and assign the received database request to a selected one of the workload definitions,
wherein the first or second monitor is configured to determine whether the collected statistics violate the one or more of the predefined rules of the selected workload definition.

19. The database system of claim 18, wherein the dispatcher is configured to select one of the first and second monitors to collect statistics for the received database request based on the selected workload definition.

* * * * *